Dec. 25, 1951  A. J. TACCHELLA  2,580,257
DEVICE FOR MOVING ICE-CREAM CONES INTO POSITION FOR RECEIVING
ICE CREAM AND THEN DELIVERING THEM TO A CUSTOMER
Filed April 25, 1946  4 Sheets-Sheet 1
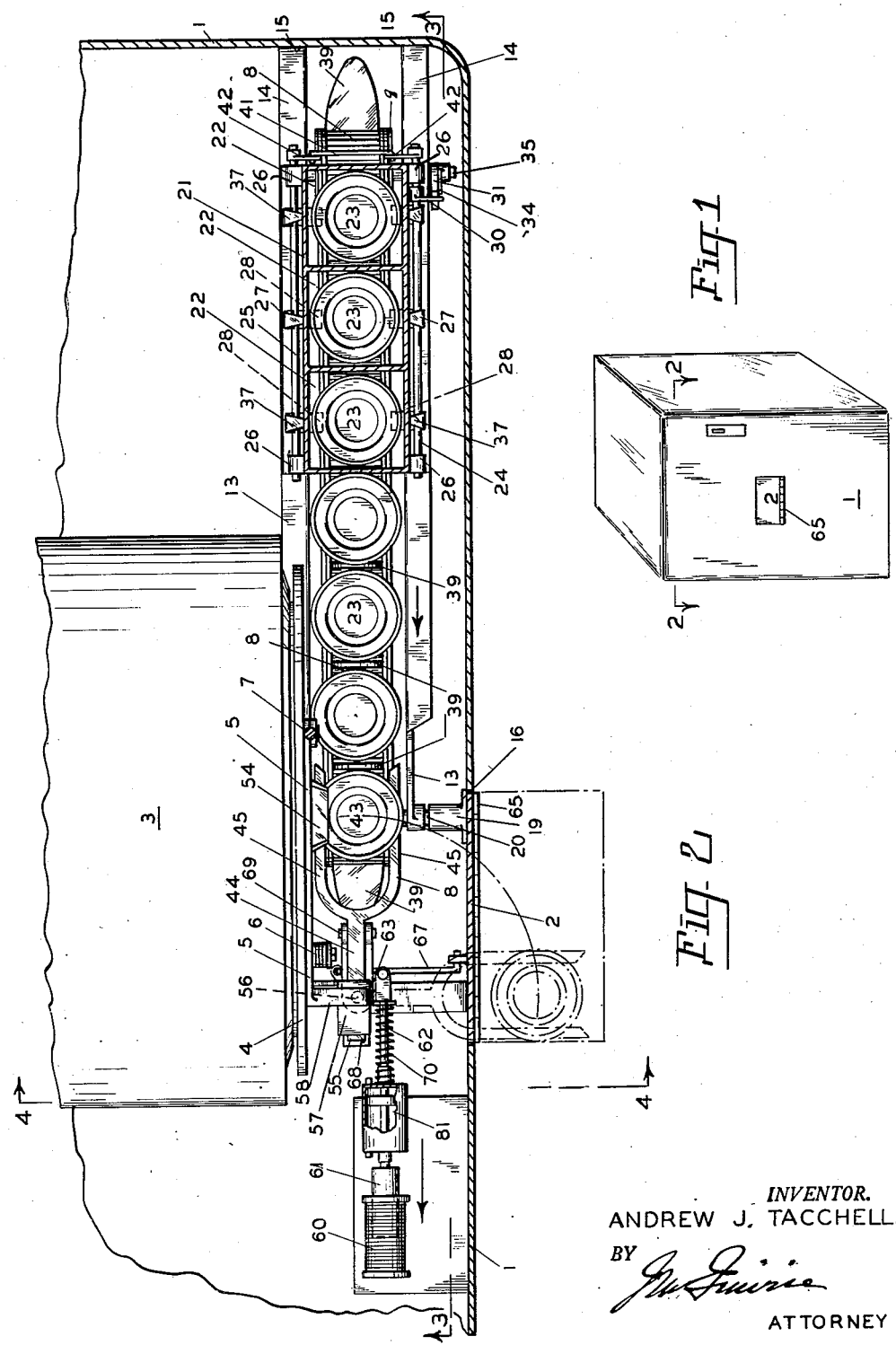
INVENTOR.
ANDREW J. TACCHELLA
BY
ATTORNEY

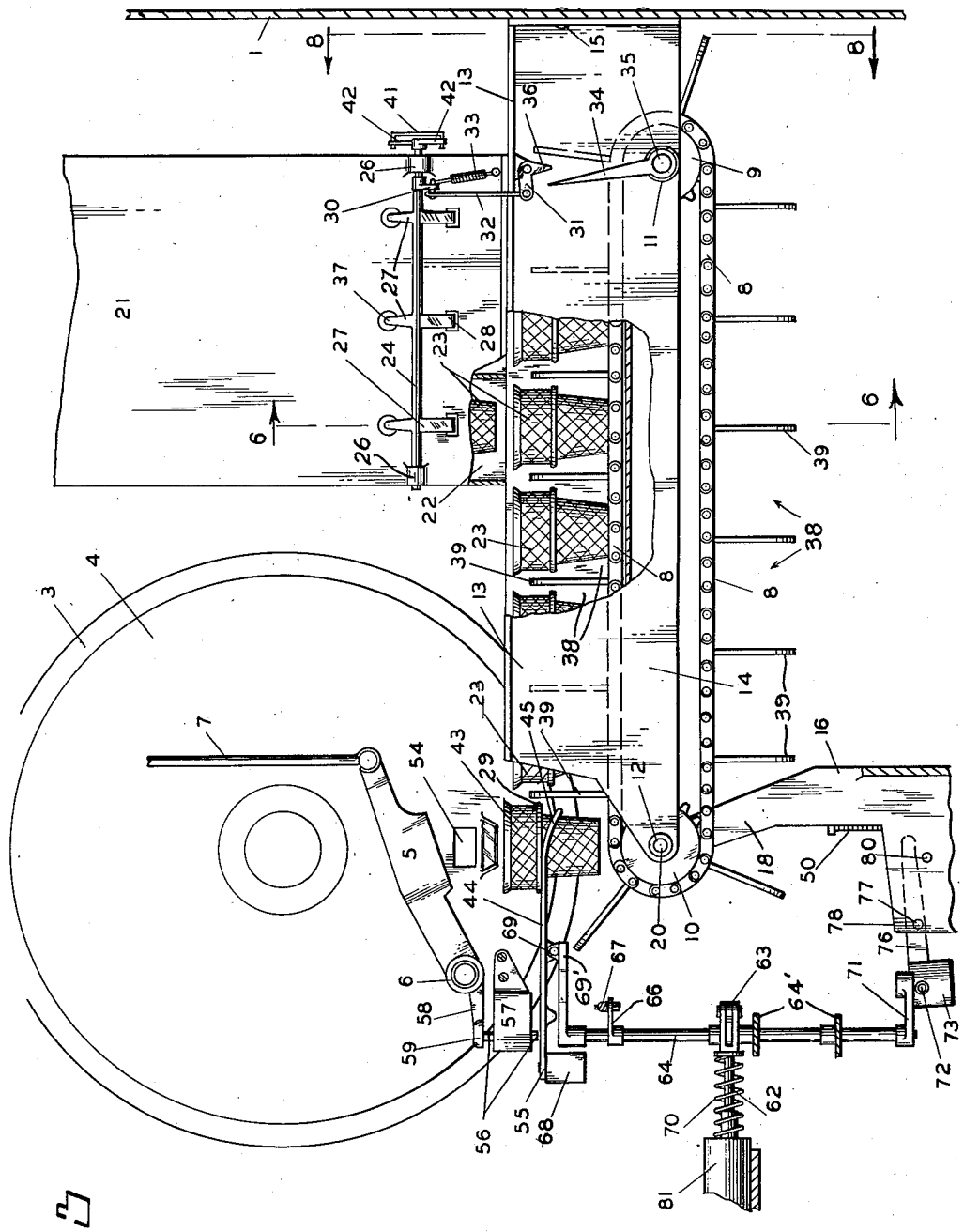

Dec. 25, 1951 A. J. TACCHELLA 2,580,257
DEVICE FOR MOVING ICE-CREAM CONES INTO POSITION FOR RECEIVING
ICE CREAM AND THEN DELIVERING THEM TO A CUSTOMER
Filed April 25, 1946 4 Sheets-Sheet 3

INVENTOR.
ANDREW J. TACCHELLA
BY

Dec. 25, 1951 A. J. TACCHELLA 2,580,257
DEVICE FOR MOVING ICE-CREAM CONES INTO POSITION FOR RECEIVING
ICE CREAM AND THEN DELIVERING THEM TO A CUSTOMER
Filed April 25, 1946 4 Sheets-Sheet 4
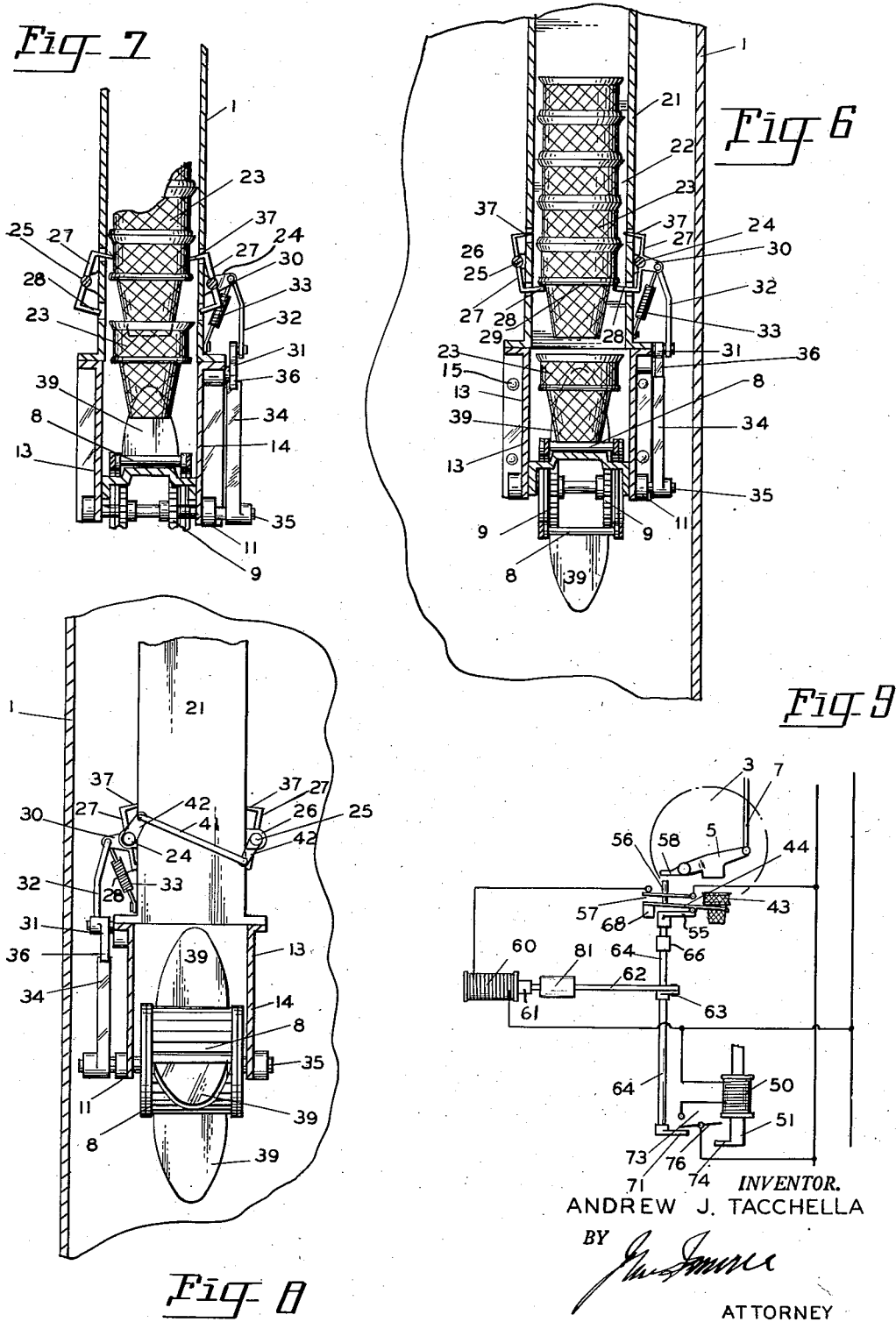
INVENTOR.
ANDREW J. TACCHELLA
BY
ATTORNEY Patented Dec. 25, 1951

2,580,257

UNITED STATES PATENT OFFICE 2,580,257

DEVICE FOR MOVING ICE-CREAM CONES INTO POSITION FOR RECEIVING ICE CREAM AND THEN DELIVERING THEM TO A CUSTOMER

Andrew J. Tacchella, Portland, Oreg., assignor, by mesne assignments, to Steady-Flow Freezer Co., a corporation of Oregon Application April 25, 1946, Serial No. 664,895

14 Claims. (Cl. 226—19)

This invention relates to automatic cone dispensing devices and is particularly adapted in the dispensing of ice cream from freezers into cones.

The primary object of the invention is to provide a device for moving ice cream cones into position relative to the ice cream dispensing gate of a freezer for receiving the dispensed cream and then delivering it automatically to the customer.

A further object of the invention is to provide automatic mechanism for moving the cone from the dispensing gate to the customer through a closed opening in the cabinet, which is also automatically opened and closed in the operation of the device.

Another object of the invention is to provide suitable mechanism for returning the cone carrying device to its starting position when the customer removes the filled cone therefrom.

A still further object of the invention is the provision of a cone rack loaded with cones which automatically dispenses these cones on to a conveyor which delivers them to the dispensing gate of the freezer.

These and other incidental objects will be apparent in the drawing, specification and claims.

Referring to the drawings:

Figure 1 is a front perspective view of an ice cream cabinet into which I have installed my new and improved cone dispensing device.

Figure 2 is a fragmentary plan sectional view taken on line 2—2 of Figure 1, illustrating the front end of the freezing unit having my new cone dispensing device mounted thereon.

Figure 3 is a fragmentary front elevation taken on line 3—3 of Figure 2.

Figure 6 is a fragmentary sectional view taken on line 6—6 of Figure 3 illustrating the mechanism for releasing the cones from the cone magazine to the conveyor.

Figure 7 is the same as that in Figure 6 but illustrating the operation of the same in dispensing the cone from the magazine to the chain conveyor.

Figure 8 is an end sectional view taken on line 8—8 of Figure 3 illustrating the method of operating the mechanism shown in Figures 6 and 7.

Figure 9 is a diagrammatical layout of the electrical circuits for controlling my new and improved cone dispensing device.

In the drawings:

Figures 4, 5:
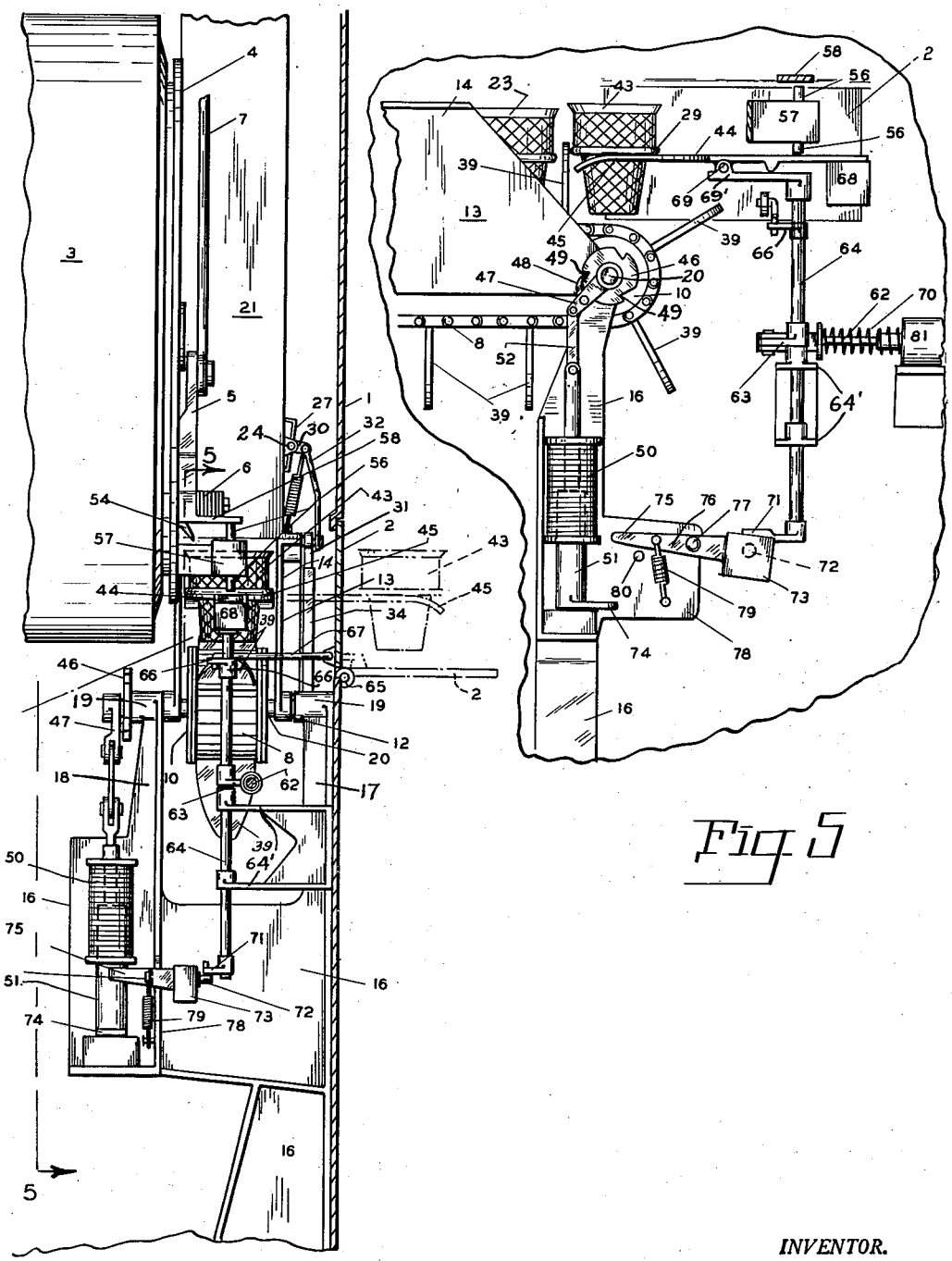
Figure 4 is a fragmentary side sectional view taken on line 4—4 of Figure 2.
Figure 5 is a fragmentary sectional view taken on line 5—5 of Figure 4, and is particularly adapted to illustrate the mechanism for moving the cone conveyor and the mechanism for controlling the operation of the delivery mechanism.

My new and improved cone dispensing device, together with the ice cream freezer unit, is located within a closed cabinet 1 having a dispensing door 2 in the front of the cabinet. This door is opened and closed by the operation of the dispensing device which I will now describe.

A standard freezing unit 3 is located within the cabinet 1 and has the usual removable end 4 mounted thereon. The ice cream dispensing gate 5 is pivotally mounted to the end 4 at 6 and is operated by the rod 7 which may in turn be operated by any suitable mechanism associated with the freezing unit. The rod 7, preferably would be controlled by a coin actuating mechanism, which would also control the operation of the freezer 3. I have in other applications Serial Nos. 610,417 and 664,670, filed August 13, 1945, and April 24, 1946, respectively, and which have become Patents No. 2,522,648, September 19, 1950, and No. 2,559,032, July 3, 1951, respectively, covered a continuous mix freezer which would be admirably adapted for having my present invention mounted thereto. In the applications which I have on file I illustrate a rod as 7 controlling the gate 5 by automatic means.

A conveyor, consisting of a chain 8 is threaded about sprockets 9 and 10. The sprockets are journalled within suitable bearings 11 and 12. These bearings are supported and form part of the frame 13. The frame 13 consists of parallel side members 14, which in turn is supported on its one end by being secured to the cabinet 1 at 15 by any suitable fastening means. The opposite end of the frame 13 is supported on the frame structure 16, which has two upwardly extending supporting arms 17 and 18, terminating in bosses 19 into which is mounted the cross shaft 20 which supports the sprocket 10 and the frame 13, best illustrated in Figures 3 and 4.

Mounted upon the frame 13 is a cone storage magazine 21. This magazine has a plurality of chambers 22, having the cones 23 stacked or nested one upon or within the other therein. The cones are dispensed one at a time from the bottom of the chambers by a mechanism that I will now describe. Shafts 24 and 25 are journalled within suitable bearings 26 on either side of the magazine 21. Fixedly mounted to the shafts are bars 27, referring especially to Figures 3, 6 and 7. In Figure 6 they are shown in a position wherein the lower fingers 28 are engaging the underside of the ledge 29 of the bottom cone supporting all of the cones 23 thereabove.

A crank or arm 30 is keyed to the shaft 24 and is connected to a bell crank 31 by the connecting link 32. The spring 33 normally holds the crank 30 in the position shown in Figure 6, causing the fingers 28 to engage the ledge 29 of the cup of the cones. As the chain 8 moves in the direction of the arrow, the arm 34, which is keyed to the shaft 35, will rotate in the direction of the arrow and will contact the arm 36 of the bell crank 31 rocking the same, raising the connecting link 32, as illustrated in Figure 7, releasing the fingers 28 from under the ledge 29 of the cone and causing the sharp pointed fingers 37 to engage the cone just above the one released, holding the cones in this position while the lower cones are dropped into the spaces 38 between the dividing partitions 39, which form part of the chain 8.

After the arm 34 passes the bell crank 36 the spring 33 will instantly rotate the shaft 24 causing the fingers 28 to catch under the ledge 29, thereby supporting the stack of cones until the next operation of the bell crank 36. I have illustrated the dispensing of three cones at a time, therefore the partitions 39 will be divided 120 degrees about the sprockets 9 and 10 as the arm 34 travels one revolution during this period dropping three cones at a time. Referring to Figure 8, a link 41 connects the shaft 24 and 25 together by the cranks 42 so that the shaft 24 will operate the shaft 25 simultaneously therewith.

I will now describe the dispensing of the ice cream or confection from the freezing unit 3. As the chain 8 travels it will move the cones therewith causing the cone at 43 to ride up on the bifurcated arm 44 best illustrated in Figures 2 and 3, the fingers 45 of the arm 44 contacting the undersurface of the ledge 29 of the cone slightly raising the cone upward. The partitions 39 force the cone up on to the arm 44 on and between the downwardly curved fingers or furcations 25 constituting the forked or bifurcated end thereof extending in a direction opposite to the direction of travel of the conveyor or chain 8 and cones 23 thereon in the spaces 38 between the partitions or cone engaging members 39 which urge the cones onto arm 44 under the ledges 29.

I will now describe the mechanism for moving the chain 8, referring to Figures 4 and 5, a ratchet wheel 46 is keyed to the shaft 20, an arm 47 is rotatably mounted to the shaft and carries a pawl 48, which engages the notches 49 of the ratchet 46. A solenoid 50, having a core 51 working therein, is connected to the arm 47 by a connecting link 52. When the solenoid 50 is energized it will raise the core 51 and will rotate the ratchet arm 47 through an arc of 120 degrees or the equivalent of one space movement of the partitions 39. When the core 51 reaches the top of its travel it will open an electric switch, demagnetizing the solenoid 50 and allowing the weight of the core to lower the same to the position shown in Figure 5. I will more fully describe the operation of this electric switch later on.

When it is desired to dispense ice cream or confection the gate 5 is opened, allowing the frozen confection to flow out the opening 54 of the end 4 of the freezer 3 into the cone 43. When the product enters the cone 43 the weight of the same will tend to pivot the arm 44, pushing the forked or finger end 45 down and raising its opposite end 55 against a plunger 56, which operates the switch 57 tending to open same by pushing up on plunger 56, but due to the arm 58 which forms part of the gate 5 resting on the upper end of the plunger 56 at 59, plunger 56 is held down and the switch 57 is held open and cannot be closed until the gate 5 is closed to raise arm 58 by the automatic operation of the freezer which determines the amount of the product entering into the cone. When the gate 5 closes, the arm 58 is raised and allows the plunger 56 to operate by the weight of the product within the cone pivoting the arm 44 as above described, forcing the plunger 56 upwardly closing the switch. The closing of this switch will energize the solenoid 60 (Figs. 2 and 9) which will pull the core 61 in the direction of the arrow, together with the rod 62 which is pivotally connected to the crank arm 63, said crank arm being keyed to the vertical shaft 64 journaled in arms of a bracket 64' carried by cabinet 1. The shaft 64 is rotated so as to move the arm 44 outwardly to the position indicated in Figures 2 and 4 by the broken lines. When this shaft is rotated it also opens the door 2 of the cabinet.

The door is hinged at 65 and is connected to a crank arm 66 keyed to the shaft 64 by the connecting link 67 and as the shaft rotates the link 67 moves the door 2 to the position indicated by the broken lines (Figs. 2 and 4) allowing the arm 44 to pass through the opening so that the customer can remove the cone. When the cone is removed it will allow the counterweight 68 to pivot the arm 44 about its pivot 69 by which arm 44 is attached to an arm 69' on the upper end of shaft 64, lowering the end 55 and allowing the plunger 56 to open the switch 57 demagnetizing the solenoid 60. This will allow the spring 70 to force the rod 62 in the opposite direction of the arrow and rotate the shaft 64 back to its original starting position as shown in Figures 2 and 3.

When the arm has returned to its initial position in line with the conveyor chain 8 it is desirable to move the chain one space placing another cone on the fingers 45 of the arm 44. When the shaft 64 returns to its starting position an arm 71 engages the plunger 72 of a switch 73, closing this switch and energizing solenoid 50 which operates to raise core 51, link 52, arm 47 and pawl 48 against a tooth or notch 49 of ratchet wheel 46 as above described moving the sprocket 10 through an arc of 120 degrees to advance the conveyor and cones thereon the required distance, after which the arm 74 of the core 51 contacts the end 75 of the bar or lever 76, which is pivotally mounted at 77 to the bracket 78 of the frame 16. This raises bar 76 to the position shown in Figures 3 and 5, allowing the plunger 72 of switch 73 to be lowered and disengaged from the arm 71 thereby opening the switch 73 demagnetizing the solenoid 50 so that core 51 drops, lowering arm 47 and pawl 48 for another operation to advance the conveyor and cones. A spring 79 normally holds the bar 76 down against a stop 80, thereby aligning the plunger 72 in alignment with the operating arm 71. A dash pot arrangement 81 causes the solenoid 60 to operate the rod 62 slowly so that a smooth operation of the vertical shaft 64 will take place in either direction.

I will now describe the operation of my new and improved cone dispensing device; first the gate 5 of the freezer is opened by any suitable mechanism not here shown. The product will be dispensed through the opening 54 into the cone 43. When the gate 5 is closed having dispensed the proper amount, the weight of the product within the cone 43 will tilt the arm 44 closing the switch 57, energizing the solenoid 60 which in turn pivotally rotates the vertical shaft 64 so as to bring the arm 44 and its filled cone to the position indicated by the broken lines. The operator then removes the cone allowing the arm 44 to tilt in such a manner as to allow the switch 57 to open demagnetizing the solenoid 60 and allowing the spring 70 to return the rod 62 to the position shown in the drawings, thereby rotating the vertical shaft 64 bringing the arm 44 back to its original position, but at the same time causing the arm 71 of the shaft 64 to engage the plunger of the switch 73, closing an electric circuit through the solenoid 50 and moving the chain conveyor 8 one position bringing another cone into position on the arm 44 and when the solenoid 50 reached its upper position it automatically moves the switch 73 out of alignment with the arm 71, allowing plunger 72 to open switch 73, breaking this circuit and allowing the core 51 to return to the position shown in the drawings. This completes a cycle of operation.

I do not wish to be limited to the exact mechanical structure as shown and described, as other equivalents may be substituted still coming within the scope of my claims.

What I claim is:

1. In a dispensing machine, including a housing for the material to be dispensed and having a dispensing gate with operating means therefor, the combination with said housing of a magazine for stacked dispensing containers, a movable member for supporting a dispensing container at the dispensing gate to be filled, an endless conveyor for carrying containers from said magazine to said member, said member being in line with the conveyor when receiving a container and adapted to elevate the same from the conveyor in filling position and move outwardly therefrom, means operatively connected with the conveyor for releasing containers from the magazine onto the conveyor, and means operated by the delivery of material into the member supported container for moving said member outwardly to effect the removal of the filled container from the dispensing gate to a delivery point.

2. In a dispensing machine, including a housing for material to be dispensed and having a dispensing gate with operating means therefor, the combination with said housing of a magazine for stacked dispensing containers, a movable member for supporting a dispensing container at the dispensing gate to be filled, an endless conveyor for carrying containers from said magazine to said member, said member being movable into and out of alignment with the conveyor, disposed in alignment therewith when receiving the containers from the conveyor and adapted to support a container free of the conveyor, means carried by the magazine and conveyor and operatively connected with the conveyor for releasing containers from the magazine onto the conveyor, means operated by the delivery of material from the dispensing gate into the member supported container for moving said member out of alignment with the conveyor to effect the removal of the filled container from the dispensing gate to a delivery point, and means operable by and following the removal of the filled container from said member at said point of delivery for effecting the return of said member to said dispensing gate and the actuation of the conveyor to supply a fresh container to said member for receiving material from the dispensing gate upon the next actuation thereof.

3. In combination a dispensing machine including a cabinet having a dispensing door, a housing enclosed in said cabinet for containing material to be dispensed and having a dispensing gate with operating means therefor, a magazine for stacked dispensing containers, releasable means carried by the magazine normally supporting the stacked containers therein and adapted upon release of the lowest container to support the containers thereabove against movement, a movable member onto which the released container is delivered for supporting said container at the dispensing gate to be filled, an endless conveyor for carrying the released containers from said magazine to said member to receive dispensed material, said movable member being disposed at one end of the conveyor to engage beneath portions of the containers when the latter are moved thereon by the conveyor to support the same free of the conveyor in receiving position, means operated by the conveyor to actuate said releasable means for releasing containers from the magazine onto the conveyor, and electromagnetic means operated by the delivery of material into the container for opening the cabinet dispensing door and moving said member with the filled container from the dispensing gate to a delievry point through said open dispensing door and outside of the cabinet.

4. In combination, a dispensing machine including a cabinet having a dispensing door, said cabinet enclosing a housing for material to be dispensed and having a dispensing gate with operating means therefor, a magazine for stacked dispensing containers, a movable member for supporting a dispensing container at the dispensing gate to be filled, an endless conveyor for carrying containers from said magazine to said member to receive dispensed material, means operated by the conveyor for releasing containers from the magazine onto the conveyor, a first electromagnetic means operated by the delivery of material into the container for opening the cabinet dispensing door and moving said member from said dispensing gate to a delivery point through said open dispensing door and outside of the cabinet, said electromagnetic means being operable following the removal of the filled container from said member at point of delivery for returning said member and closing the dispensing door, and a second electromagnetic means actuated by the return operation of said first electromagnetic means for moving the conveyor one step to deliver another container to said member to receive material from the housing upon the next actuation of the dispensing gate.

5. The combination set forth in claim 4, wherein said second electromagnetic means is automatically de-energized upon the movement of said conveyor one step.

6. The combination set forth in claim 5, wherein a switch controls the second electromagnetic means, said first electromagnetic means including a member for closing said switch, and said second electromagnetic means including a member for opening said switch upon its actuation of moving said conveyor and for rendering said switch inoperative by said first electromagnetic means until said last mentioned means has again been actuated.

7. In combination, a dispensing machine including a housing for material to be dispensed and having a dispensing gate with operating means therefor, a magazine for stacked dispensing containers, an endless conveyor for carrying containers from said magazine into position to receive material from the dispensing gate, a movable member independent of and in line with the conveyor for receiving a container from the conveyor, elevating and supporting the same in the latter position while receiving the material, trip mechanism for said magazine and supporting the containers above the conveyor, said trip mechanism including rockers normally positioned for engaging the bottom container of said stack but movable to disengage the bottom container and engage the next to bottom container and then movable after removal of the disengaged container to lower the stack and reengage the then bottom container, means operatively connected with the conveyor for actuating said trip mechanism to release the bottom container for delivering containers to the conveyor to replace filled containers removed therefrom, means operative upon the containers being filled and the gate closed to move the member to a position for removal of the filled containers therefrom, means operative upon such removal to return the member to initial position, and means operative upon the return of the member for progressively moving the conveyor to carry containers toward the dispensing gate and upon the members for filling, to replace the containers as the filled containers are successively removed therefrom.

8. In combination, a dispensing machine including a housing for material to be dispensed and having a dispensing gate adapted to be intermittently opened and closed, together with operating means therefor, a magazine having a plurality of aligned chutes for each to hold a stack of dispensing containers, an endless conveyor positioned beneath said magazine and aligned with said chutes for carrying containers from said magazine into position to individually receive dispensed material from the housing when the gate is opened, trip mechanism for said magazine supporting the lowermost containers of each stack above the conveyor, means operatively connected with the conveyor for actuating said trip mechanism for simultaneously releasing and delivering the lowermost container from each stack to the conveyor to replace filled containers removed therefrom, said trip mechanism, including means actuated therewith and operative upon such release to engage the containers thereabove to support the remaining containers in the stacks, means for receiving the containers from the conveyor and supporting the same in material receiving position free of the conveyor, said latter means being movable to a delivery position upon the container being filled, and means for moving the conveyor step-by-step the distance of one container at and between each delivery of a plurality of containers from the stacks to carry containers toward the dispensing gate as the filled containers are successively removed therefrom.

9. In combination, a dispensing machine including a housing for material to be dispensed and having a dispensing gate with operating means therefor, a magazine having a plurality of aligned chutes for each to hold a stack of dispensing containers, an endless conveyor positioned beneath said magazine and aligned with said chutes for carrying containers from said magazine into position to individually receive dispensed material from the housing, trip mechanism for said magazine and supporting the lowermost containers of each stack above the conveyor, means operatively connected with the conveyor for actuating said trip mechanism for simultaneously delivering the lowermost container from each stack to the conveyor to replace filled containers removed therefrom, said trip operating means including a wheel and its shaft supporting the end of the conveyor and an arm extending from the shaft for engagement with the trip mechanism upon each complete rotation of the wheel for simultaneously delivering the lowermost container from each stack onto the conveyor, and means for moving the conveyor step-by-step to carry containers toward the dispensing gate as the filled containers are successively removed therefrom.

10. In combination, a dispensing machine including a housing for the material to be dispensed and having a dispensing gate with operating means therefor, a magazine for stacked dispensing containers, a pivoted member for supporting a container in position to receive material from the dispensing gate, an endless conveyor for successively moving the containers from said magazine to said pivoted member as the filled containers are successively removed therefrom, a weight balancing the pivoted member in front of the dispensing gate until the container supported thereby is filled, means operated by the unbalancing of said member by a filled container for swinging the pivoted member with the filled container outward from the dispensing gate to a delivery point, and means actuated by said dispensing gate for rendering said swinging means inoperative until said gate is closed.

11. In combination, an ice cream dispensing machine including an ice cream housing having an ice cream dispensing gate with operating means therefor, a confection cone magazine for stacked cones, a pivoted member for supporting a cone at said dispensing gate to be filled, an endless conveyor for carrying cones from said magazine to said member, trip mechanism for said magazine and supporting the cones above the conveyor, means for actuating said trip mechanism for releasing cones onto the conveyor, a weight balancing the pivoted member supporting a cone in front of the ice cream dispensing gate until the cone is filled, means operated by the unbalancing of said member by a filled cone for swinging said pivoted member outward from the dispensing gate to a delivery point, means operable by said dispensing gate for rendering said swinging means inoperative until the gate is closed, and means operable after the removal of the ice cream filled cone from the cone dispensing supporting means to return the pivoted cone supporting member and actuate the conveyor to replace a cone therefrom onto said cone dispensing member in position to receive ice cream from the dispensing gate upon a subsequent actuation of the dispensing gate operating means.

12. In combination, an ice cream dispensing machine including an ice cream housing having an ice cream dispensing gate with operating means therefor, a confection cone magazine for stacked cones, a pivoted member for supporting a cone at the dispensing gate to be filled, an endless conveyor for carrying cones from said magazine to said pivoted member, means for successively moving the conveyor carrying cones toward the pivoted member as the ice cream filled cones are successively removed therefrom, a weight balancing the pivoted member in front of the ice cream dispensing gate until the cone is filled, electromagnetic means operated by the unbalancing of said member by a filled cone for swinging the member outward from the dispensing gate to a delivery point, means operable by said dispensing gate for de-energizing said electromagnetic means until the dispensing gate is closed, means operable by the balancing of said weight after the removal of the ice cream filled cone from the pivoted member for operating said electromagnetic means to return the pivoted member to the dispensing gate and actuate the conveyor to supply a cone to said member in position to receive ice cream from the dispensing gate upon a subsequent actuation of the dispensing gate operating means, said weight operable means including a ratchet wheel for advancing the conveyor one step at a time, an electromagnetically actuated pawl for operating the ratchet wheel, and a switch operated by the cone supporting means upon its return from the dispensing point for energizing the actuation of said pawl, and operated upon the actuation of said pawl for opening said switch and de-energizing the actuation of said pawl.

13. In a dispensing machine, means for supporting a plurality of nested cones, having ledges, means for receiving and advancing cones to a filling position for ice cream, means actuated by the movement of the advancing means to individually release the bottom cone from the supporting means onto the advancing means and engaging the next cone thereabove to support the remaining cones, means to receive, elevate and support the released cone beneath its ledge as it is advanced to the filling position, said latter means being movable outwardly away from the filling position, means actuated upon the filling of the cone to move the latter means and filled cone outwardly in a position to permit removal of the filled cone therefrom, means actuated by the removal of the filled cone to move said latter means back to cone receiving and filling position, and means actuated by the last-mentioned movement to actuate the advancing means to present another cone to filling position.

14. In a dispensing machine, a magazine for nested cones, an endless conveyor for carrying cones from said magazine into position to be filled, trip mechanism for said magazine supporting the cones therein above the conveyor, said trip mechanism including rockers having lower fingers normally positioned to engage beneath an intermediate portion of the bottom cone in the magazine to support the cones therein but movable to disengage the bottom cone to release same onto the conveyor, and having upper fingers to engage the next to bottom cone to temporarily support the cones thereabove, and then movable after movement of the released cone with the conveyor to disengage from the next to bottom cone to lower the cones in the magazine and re-engage the lower finger with the then bottom cone, means operated by the movement of the conveyor for actuating said trip mechanism for delivering a cone to the conveyor to replace a filled cone removed therefrom, and means actuated by removal of a filled cone to progressively move the conveyor to carry the cones to filling position.

ANDREW J. TACCHELLA.

REFERENCES CITED

The following references are of record in the file of this patent:

UNITED STATES PATENTS

| Number | Name | Date |
|---|---|---|
| 500,155 | Rowland et al. | June 27, 1893 |
| 1,262,256 | Redd | Apr. 9, 1918 |
| 1,683,950 | Borchert | Sept. 11, 1928 |
| 1,882,812 | Gunn | Oct. 18, 1932 |
| 1,938,416 | Cook | Dec. 5, 1933 |
| 2,324,930 | Joa | July 20, 1943 |